(No Model.) 3 Sheets—Sheet 1.

W. B. LAWRENCE.
PRINTING PRESS.

No. 447,491. Patented Mar. 3, 1891.

WITNESSES:
Coleman A. Barry
Jno. H. Fravel

INVENTOR
William B. Lawrence
BY
C. C. Shepherd
ATTORNEY.

(No Model.) 3 Sheets—Sheet 2.

W. B. LAWRENCE.
PRINTING PRESS.

No. 447,491. Patented Mar. 3, 1891.

WITNESSES:
Colman A. Bury
W. H. Taft

INVENTOR
William B. Lawrence
BY C. C. Shepherd.
ATTORNEY.

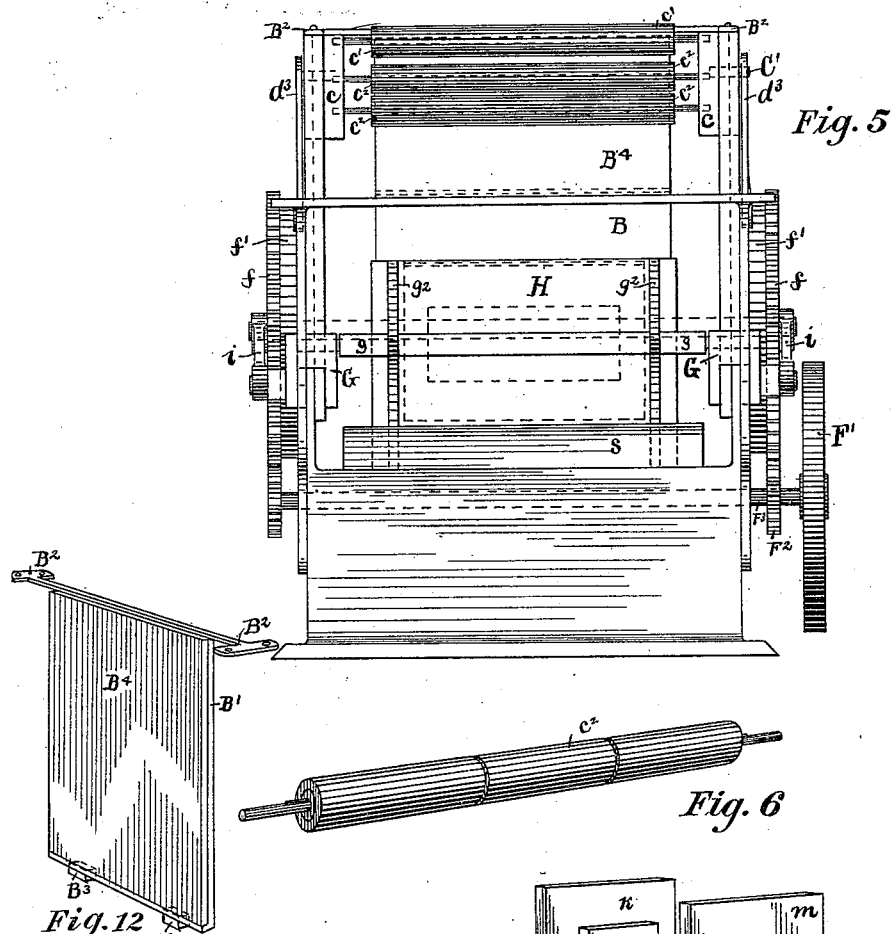

UNITED STATES PATENT OFFICE.

WILLIAM B. LAWRENCE, OF COLUMBUS, OHIO.

PRINTING-PRESS.

SPECIFICATION forming part of Letters Patent No. 447,491, dated March 3, 1891.

Application filed January 2, 1890. Serial No. 335,645. (No model.)

*To all whom it may concern:*

Be it known that I, WILLIAM B. LAWRENCE, a citizen of the United States, residing at Columbus, in the county of Franklin and State of Ohio, have invented a certain new and useful Improvement in Printing-Presses, of which the following is a specification.

My invention relates to the improvement of printing-presses; and the objects of my invention are to produce a press of this class which shall be durable, effective, positive in its operation, and which may be produced at a reasonable cost of manufacture and without complication, to so construct said device as to admit of printing in one, two, or more colors at one impression, and to cause said colors to register properly. These objects I accomplish in the manner illustrated in the accompanying drawings, in which—

Figure 1:
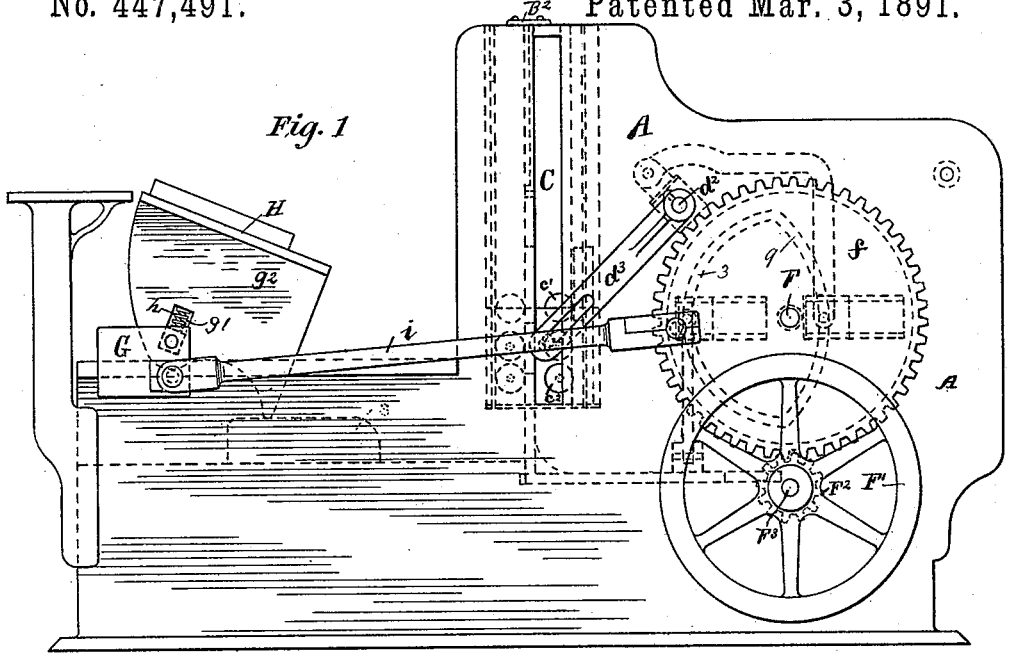
Figure 2:
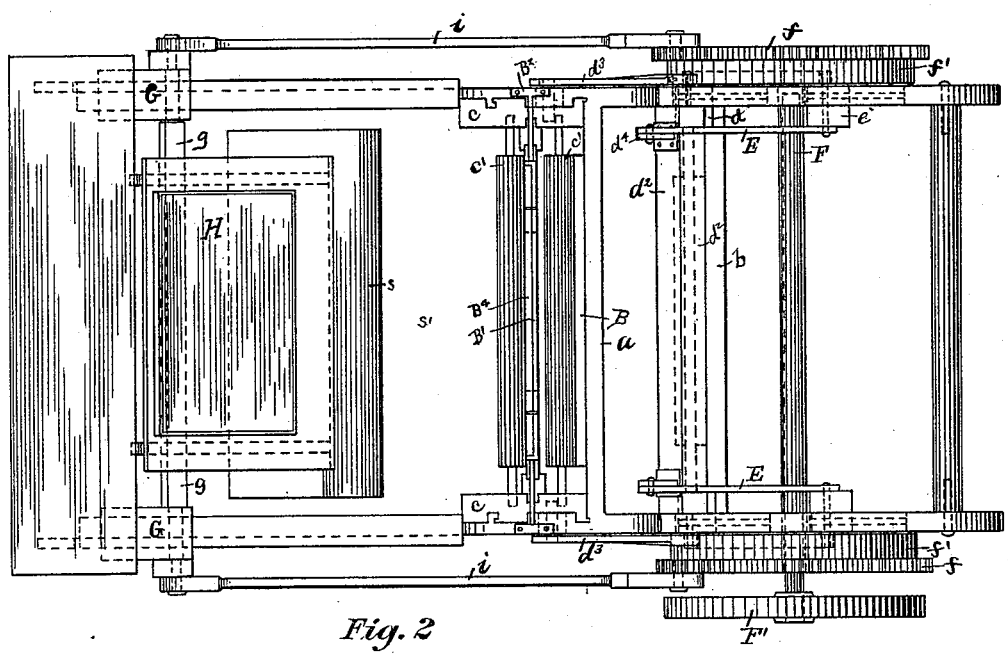
Figure 3:
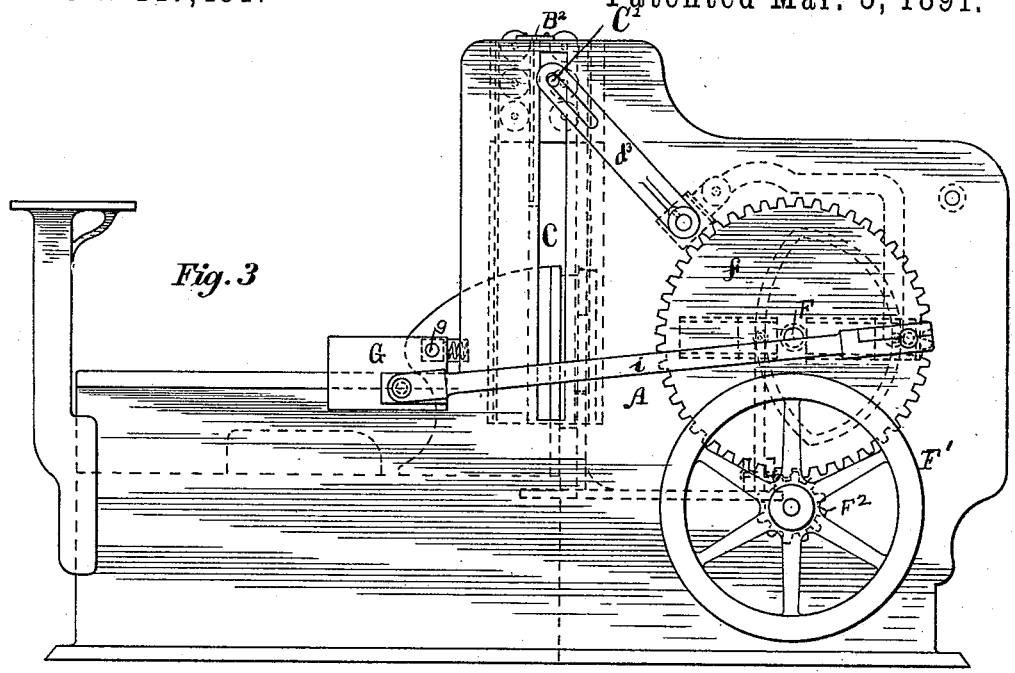
Figure 4:
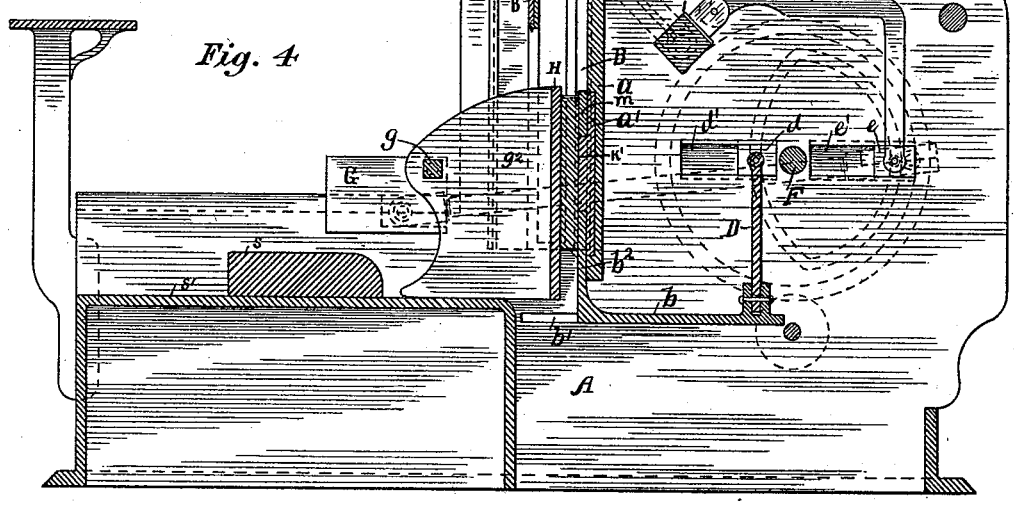

Figure 1 is a side elevation of my improved press, showing the position of parts prior to making the impression. Fig. 2 is a plan view of the same. Fig. 3 is a side elevation showing the position of the parts when the impression is being made. Fig. 4 is a central longitudinal section of the same. Fig. 5 is a front end elevation. Fig. 6 is a view in perspective of an ink-roller. Fig. 7 is a perspective view of the stationary printing plate or form. Fig. 8 is a view of the skeleton plate. Fig. 9 is an inner side view in detail of one of the cam disks or wheels, showing a portion of the side wall of the machine-frame and showing the camway and position of the idlers therein. Fig. 10 is a vertical section taken on line $x\ x$ of Fig. 9. Fig. 11 is a view in perspective of a portion of the movable bed, showing the form-suppporting frame; and Fig. 12 is a perspective view of the front-roller inking-pad.

Similar letters and figures refer to similar parts throughout the several views.

A represents the vertical and parallel side frame-walls of my improved press, which may be approximately solid, as shown, or may consist of open frame-work of the desired pattern. The frame may be supported upon any desired form of base or standards.

Extending transversely between the side walls A from the upper edges to a point beneath the center of the height thereof is a vertical and stationary bed-plate $a$, which has formed in its front face and lower half a form depression or seat $a'$. Secured to said front face of the bed-plate $a$ above the form-seat $a'$ are one or more ink plates or strips B. This ink-strip is preferably formed of the material or composition commonly used for printing-ink rollers, and is secured against the face of the vertical bed by any well-known means.

$b$ represents a horizontal traveling bed-plate located beneath the stationary bed-plate and having its ends or extensions thereof supported and adapted to slide within oppositely-located horizontal slots or guideways $b'$, formed in the side walls A. The forward end of the bed-plate $b$ is turned upward in front of the bed $a$ in the form of a frame $b^2$, which consists, as shown in Fig. 11 of the drawings, of the upwardly-extending forward end of the traveling bed-plate and a vertical standard extending upward from each end thereof. These standards are each provided with a vertical groove or guideway in their inner edges.

Formed in the side frame-pieces A a short distance in front of the stationary plate $a$ are oppositely-located vertical slots C. Each of these slots receives and forms a guideway for an outwardly-projecting pin $C'$ of a roller-bearing block $c$, which, as shown, bears and slides against the inner face of the side frame, and is also provided with outwardly-projecting ribs which enter and travel within suitable guide-grooves in said frame. In the inner face of each of these blocks $c$ are journaled, respectively, the ends of six ink-rollers, said rollers being thus supported in two vertical rows of three each, said rows being on opposite sides of the center of the width of the block. As will be more fully explained, the upper roller of each set of three (indicated by the letter $c'$) is an ink-distributing roller, while the remaining rollers $c^2$ are form-inking rollers. As shown in Fig. 6 of the drawings, these rollers consist of a central shaft provided with a covering of roller composition. For reasons hereinafter explained, these roller-covers may be divided into slightly-separated sections, as shown in said Fig. 6, the sections of the rear rollers corresponding in number and length with the number and breadth of the composition strips B of the bed-plate $a$.

B' represents a vertical composition-supporting plate, which extends transversely within the sides of the press-frame and extends downwardly from the top of said frame between the two vertical rows of rollers. This plate is of such length as to prevent its contact with the roller-bearing blocks, and is supported rigidly from the top of the press-frame by means of short outwardly-extending top arms $B^2$, which are secured to said press-frame top. The lower edge of the plate B' is provided with a short forwardly-projecting flange provided at intervals with vertical mortises, into which extend the downwardly-projecting tongues $B^3$ of one or more composition inking-strips $B^4$, the latter being secured to the front face of the plate B'. The rear end of the traveling bed-plate $b$ terminates at a point in rear of the vertical plate $a$, and has secured thereto and supported thereon a transverse vertical plate D. This cross-plate D is rigidly secured at each end adjoining its upper side to the inner face of a cross head or block $d$, said cross-head being seated and adapted to slide within a short horizontal slot or guideway $d'$, formed in the side frame-wall A.

Extending transversely between the side walls of the frame slightly in rear of the stationary bed-plate $a$ is a shaft $d^2$, which is preferably square in cross-section, as shown. This shaft has its rounded end portions passing through and journaled in the side walls A at points above and in front of the bed cross-plate D. The outer ends on the outer side of the frame-walls of this shaft $d^2$ are rigidly connected with the rear ends of forwardly-extending drive-arms $d^3$. Each of these drive-arms has its forward portion provided with a central longitudinal slot, into which extends and bears loosely the outwardly-projecting pin C' from the roller-bearing block $c$.

Projecting upwardly from the upper side of the shaft $d^2$, at a point near the inner face of each of the side walls A, is a short bearing-lug $d^4$, to each of which is pivoted the forward end of a rocking arm E. This rocking arm extends rearwardly to a point above and beyond the cross-plate D, and thence downwardly to a point in rear of and in horizontal alignment with the upper end of said plate D, where it is pivotally connected with the inner face of a cross-head $e$, which is seated and adapted to slide within a short horizontal slot or guideway $e'$, formed in the frame-wall A.

Extending transversely between the side frame-walls and having its ends journaled in said frame-walls between the guideways $e'$ and $d'$ is a shaft F, each of the outwardly-projecting ends of which has mounted thereon a gear-wheel $f$, on the inner face of each of which is formed a cam-disk $f'$, which is adapted to travel in close proximity to the press-frame. One of the gear-wheels $f$ gears with a pinion $F^2$, mounted on a shaft $F^3$, extending between the frame-walls beneath the shaft F. This shaft $F^3$ carries a belt or drive wheel F'.

Each of the cam-disks $f'$ has formed in its inner face a camway $f^2$, which, as shown in detail in Fig. 9 of the drawings, is formed by the connection of two grooves 3 and 9, which describe two different arcs of a circle. The arc of the larger circle, on which the groove 9 is formed, cuts the face of the disk in close proximity to the center thereof and meets the ends of the groove 3, which forms the arc of a smaller circle and which runs parallel with the periphery of one side of the disk.

$e^3$ represents an idler or pin which projects outwardly from each of the cross-heads $e$ and into the camway $f^2$. A similar idler $d^5$ projects from the cross-head $d$ into said camway, said pins being at opposite points therein, as hereinafter more fully set forth.

That portion of the press-frame in front of the rollers is, as shown, cut down to about one-half of the height of the central or roller-supporting portion. The upper sides or edges of this lower forward portion each present a track for a sliding cross-head G, which is adapted, as hereinafter described, to travel backward and forward thereon.

Pivotally supported between the cross-heads G is a platen-shaft $g$, which is square in cross-section. This shaft passes through and rests within the lower ends of oppositely-located vertical mortises $g'$, formed in the vertical end frame-pieces $g^2$, which support the platen H, said shaft being held under spring-pressure by coiled springs $h$, which bear between the shaft and the upper ends of the mortises. The forward ends of the platen frame-pieces $g^2$ extend slightly below the body of the frame, said downwardly-extending portions being pointed and resting upon a cross-block $s$, which, as shown, rests upon a floor or base $s'$, which extends between the side frame-walls. The outer side of each of the cross-heads G is pivotally connected with the forward end of a drive-arm $i$, the rear end of which is pivoted eccentrically to the outer face of the gear-wheel $f$, which is on the corresponding side of the press-frame.

Before operating my improved press a form $k$ is locked within the form-seat $a'$ of the vertical bed $a$, the outer face of the base or body of said form and the chase being flush with the face of said bed, while the printing-face $k'$ of the color block or type projects therefrom, as shown in Fig. 7 of the drawings. Inserted and supported within the grooved edges of the movable form-frame $b^2$, opposite and in front of the form $k$, is a skeleton form or printing-block $m$, which is of a thickness corresponding with the thickness of the outwardly-projecting printing-face of the form $k$, and which is provided with a mortise so located and arranged as to receive said projecting printing-face of the form $k$ when said forms are brought together, as hereinafter described.

Any well-known ink-feeding device may be supported above the press, which will serve to feed the ink upon the ink-strips B and $B^4$.

The operation of printing by my device is as follows: The parts being in the position shown in Fig. 1 of the drawings—that is, idlers $d^5$ projecting into the center of the portion 9 of the camway $f^2$, the idler $e^3$ projecting into the center of the portion 3, the inking-rollers being below the forms, and the platen being tipped slightly to the rear and the forward end of its frame resting upon the cross-frame block $s$—motion is communicated to the parts as follows: The belt or drive wheel $F'$ being turned by a belt or other means, rotary motion is communicated through its shaft and pinions $F^2$ to gear-wheels $f$ and their cam-disks $f'$. This rotation of the cam-disks will bring the idler $e^3$ into frictional contact with the shoulder of the long arc 9 and operate to drive said idlers and cross-heads $e$ rearwardly. This rearward movement of the cross-heads $e$ will, through the arms E, cause the partial rotation rearward of the shaft $d^2$. Through this movement of the shaft $d^2$ an upward vertical movement is transmitted, through the consequent elevation of the arms $d^3$, to the roller-bearing blocks $c$. The rollers having been thus carried to the upper portion of the press, the cam-disk will have turned sufficiently to bring the idler $e^3$ into the short arc 3 of the camway, where it will for a time remain at rest, that portion of the camway being concentric with the shaft. The above-described rotary movement of the gear-wheels will, as the rollers are being driven upward, cause through the drive-arms $i$ a forward movement of the cross-heads G and platen H, the frame of said platen traveling upon the cross-block $s$ until the pointed ends of said frame drop over the forward edge of said block and allow the platen and its pivoted shaft to drop forward by gravity to a position approximately at right angles with its former position and rest upon the floor $s'$ facing the skeleton form. At this time the idlers $d^5$ enter the portions 9 of the camways, and are therefore driven with their cross-heads $d$ rearwardly. This movement of the cross-heads $d$ will result in a similar rearward movement of the sliding bed-plate $b$, and the movement of the latter will operate to drive the skeleton form $m$ against the form $k$, allowing the projecting printing-face of the latter to enter the mortise of the former and bringing the front face of the latter flush with the front face of said projection. The hereinbefore-described upward movement of the rollers will cause the rear set to be brought into contact with and travel against the face of the printing projection $k'$, after which they are brought into contact with the ink-strip B. The forward rollers, as will be seen, are at the same time brought necessarily into contact with the printing-face of the form $m$ and ink-strip $B^4$, the contact with the former being accomplished before the skeleton frame has started rearward, as described. While the rollers are at rest at the top of the press the rearward motion of the platen upon the floor $s'$ is continued until it presses the paper to be printed upon firmly against the flush faces of the two forms to produce the impression. At this time the spring $h$ acts as a cushion to prevent the results of too great pressure. A revolution of the gear-wheels having been completed, the arms $i$ will force the platen back to its former position, the idlers will shift into a different portion of the camway, and the cross-heads $d$ and $e$ will successively return to the first-described positions. These movements will result in the forward movement of the bed-plate $b$ and its skeleton-form frame and the downward movement of the rollers to the position first described. The inking pads or strips B and $B^4$ having each been supplied with ink of a different color, it will be seen that the contact of the front and rear rollers with said pads and the forms $k$ and $m$ will result in the application of two colors of ink to the printing-faces. It is obvious that by forming the rollers in slightly-separated sections, as shown in Fig. 6 of the drawings, and forming the ink-pads in correspondingly oppositely-located strips, each provided with ink of a different color, corresponding printed faces of the forms may be thus supplied with the desired color of ink, admitting of printing in the desired number of colors at one impression.

An especial feature of my invention consists in the conversion of a rotary movement to an intermittent vertical and reciprocating movement, which, as described, is accomplished through the peculiar construction of the cam-disk, the connection therewith of the cross-heads, idler, and connection of said cross-head with the roller-bearing blocks. By the use of said cam-disks and the connection therewith of the cross-heads and idlers it will be seen that all the movements necessary to carry on the inking and printing process are accomplished, and that the means for accomplishing the same are comparatively simple of construction and positive in their action.

I am aware that printing-presses have been constructed in which a stationary and movable printing-form have been used in conjunction; but these presses differ from that herein shown and described in many points of construction and operation.

It is evident that I may cause the traveling bed-plate $b$ to remain stationary for the purpose of doing ordinary one-color printing. This may be accomplished by providing means for releasing the idlers $d^5$ of the cross-heads $d$ from engagement with the camway; but this construction may be set forth in a future application for patent.

Having now fully described my invention, what I claim, and desire to secure by Letters Patent, is—

1. In a printing mechanism, the combination, with the press-frame and its form-carrying frame $b^2$, of the revolving cam-disk having therein a camway formed by the connection of a concentric and eccentric groove, a cross-head sliding within the press-frame, an idler projecting therefrom within said camway, and a horizontal traveling bed-plate connected with said cross-head, substantially as described.

2. In a printing mechanism, the combination, with a frame, ink-rollers supported in vertically-sliding bearings, shaft F, and cam-disks $f'$ thereon, said disks having the camway $f^2$, consisting of two connected grooves respectively concentrically and eccentrically located therein, of the sliding cross-head $e$, its idler projecting into said camway, and shaft $d^2$, connected with said cross-heads $e$ by arms E and with the roller-bearing blocks by slotted arms $d^3$, substantially as described.

3. In a color-printing-press mechanism, the combination, with the frame, of two vertical sets of inking-rollers horizontally-journaled in sliding blocks, two inking-pads, as described, revolving cam-disk $f'$ and camway $f^2$ in each of said disks, consisting of a concentric and eccentric groove, sliding cross-head $e$, having an idler which projects within said camway, as described, rocking arms E, connecting cross-head $e$ and a shaft $d^2$, and slotted arms $d^3$, connecting, as described, the shaft $d^2$ and roller-bearing blocks, substantially as specified.

4. In a printing mechanism, the combination, with the frame, the movable and stationary bed-plate arranged as described, the former supporting a form-frame $b^2$ in front of the latter, two vertical rows or sets of horizontal inking-rollers pivotally supported in vertically-sliding blocks, and printing-forms supported, as described, in the frame $b^2$ and bed-plate $a$, of cam-disks $f'$, supported, as described, on rotated shaft F, a camway $f^2$ in each of said disks, consisting of a concentric and eccentric curved groove, horizontally-sliding cross-heads $e$ and $d$, having idlers which project, respectively, into the portions 9 and 3 of said camway, vertical cross-plate D, connecting cross-heads $d$ and bed-plate $b$, rocking arms E, connecting cross-heads $e$ and shaft $d^2$, and slotted arms $d^3$, connecting, as described, the shaft $d^2$ and roller-bearing blocks, substantially as described.

WILLIAM B. LAWRENCE.

In presence of—
C. C. SHEPHERD,
J. H. FRAVEL.